Jan. 3, 1928.
C. M. MURPHY
1,655,328
GATE OPERATING DEVICE
Filed Nov. 4, 1926    2 Sheets-Sheet 1
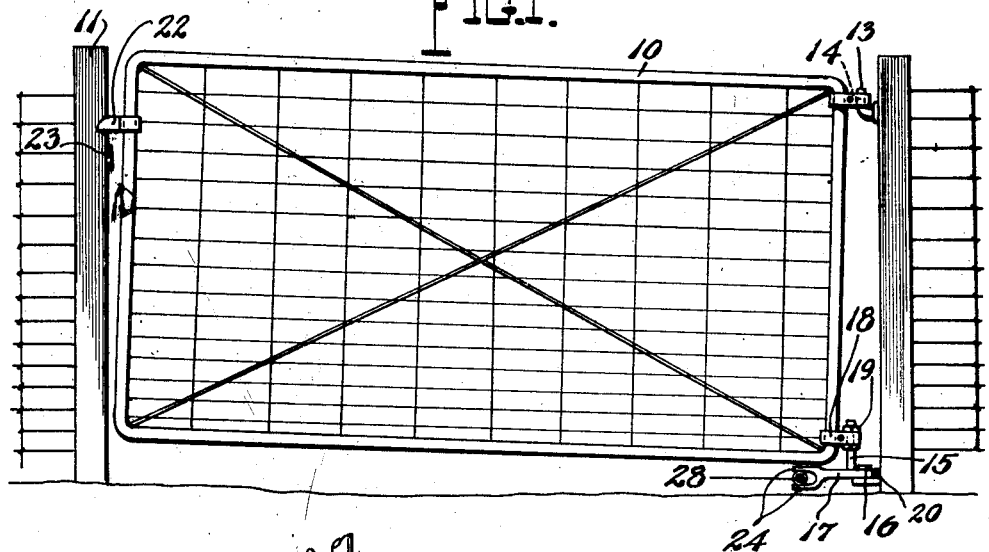
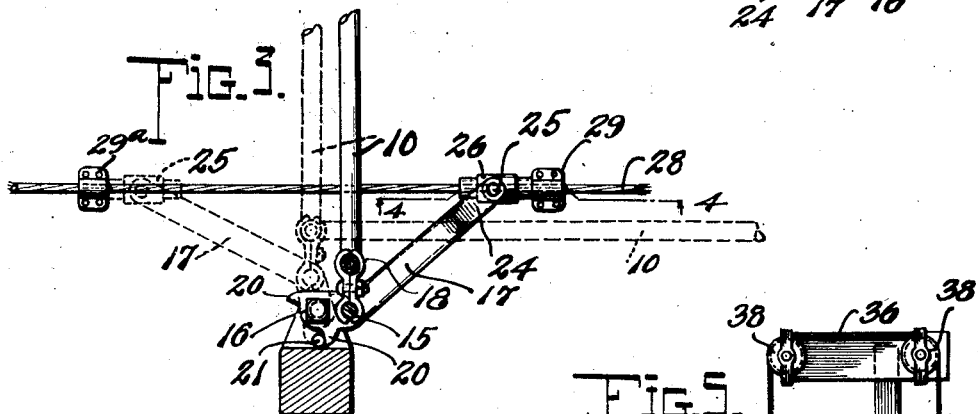
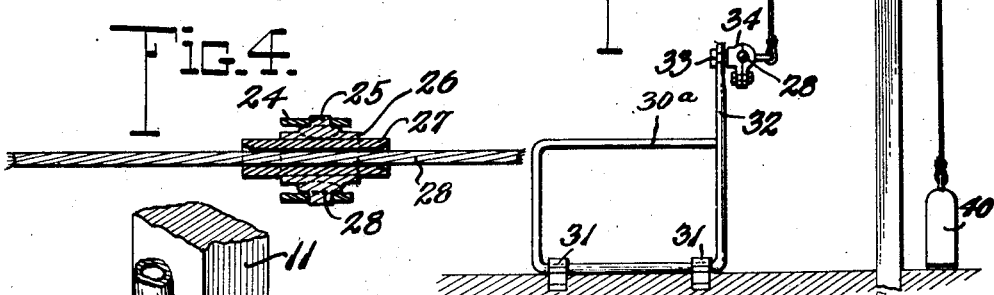
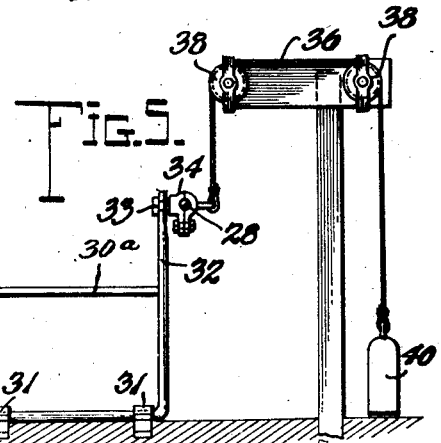
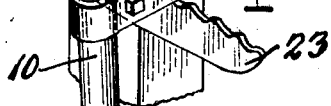
Inventor
C. M. Murphy
By Robb & Robb & Hill
Attorneys

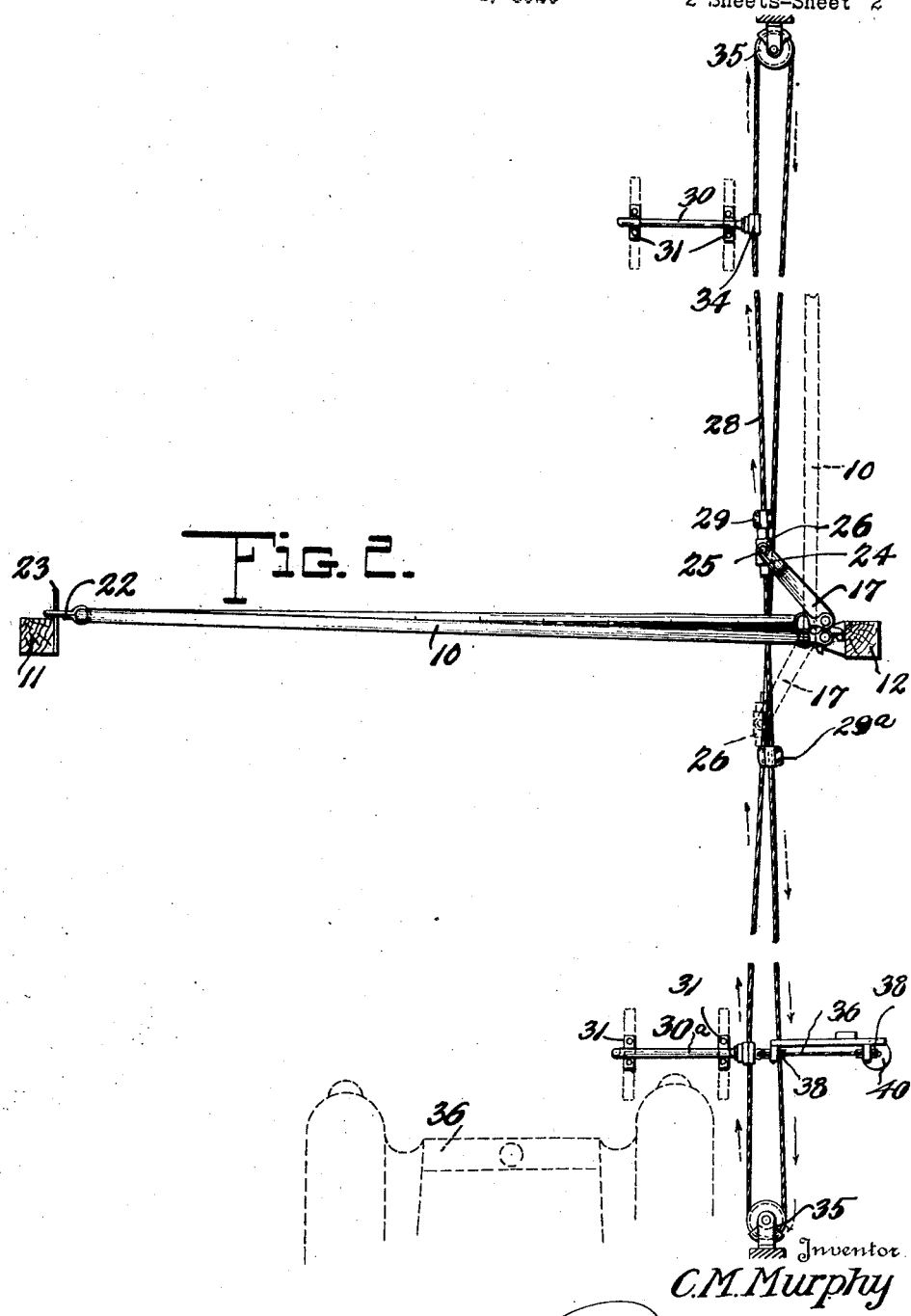

Patented Jan. 3, 1928.

1,655,328

UNITED STATES PATENT OFFICE.

CLIFFORD M. MURPHY, OF PHOENIX, ARIZONA.

GATE-OPERATING DEVICE.

Application filed November 4, 1926. Serial No. 146,209.

This invention relates to a gate operating device, and particularly to a construction in which the gate is operated by oppositely disposed trip devices adapted to shift the pivotal axis of the gate laterally to permit its opening and closing action by gravity.

In this type of gate operating mechanism it is important to provide for the releasing and shifting for opening the gate by one trip device, the retention of the gate in open position by gravity, and the closing of the gate by gravity incident to a reverse shifting of one of its pivots by an oppositely located trip device. These trip members, to secure efficient operation, should be connected for successive opening and closing actions in either direction, which involves an automatic restoring of the trips to operative position after their action upon the shifting lever for the gate pivot.

Further, it has been found important to dispose the lever for shifting the pivotal axis of the gate at the lower pivot thereof so that the weight of the gate acts to retain the lever in either of its shifted positions.

The invention has for an object to provide a novel and improved construction of shifting lever carrying a pivot for the gate disposed eccentrically to the lever pivot and adapted to shift the pivotal axis of the gate laterally to permit its automatic movement by gravity, said lever being operated by a connection extending between opposite trips and having means successively engaging the lever.

A further object of the invention is to provide an improved arrangement and mounting for the gate with an upper fixed pivot and a lower pivot mounted eccentrically to the pivot of a shifting lever, whereby the gate when about to open stands in a position inclined to the horizontal and the weight thereof in its gravity operation tends to hold the lever in its opposite shifted positions.

Another object of the invention is to present an improved construction of the operating connection for a lever carrying a gate pivot, and comprises an endless crossed cable extending between trips at opposite sides of the gate, one run of such cable being provided with spaced members each disposed to actuate the lever in one direction.

Other objects and advantages of the invention will be hereinafter set forth and the novel features thereof defined by the appended claims.

In the accompanying drawings:

Figure 1 is an elevation of a gate with the invention applied thereto;

Figure 2 is a plan of a gate with its associated trip members;

Figure 3 is a detail elevation of the shifting lever and its gate connection;

Figure 4 is a detail section on the line 4—4 of Figure 3;

Figure 5 is a front elevation of one of the trip members; and

Figure 6 is a detail perspective of the latch device.

Like numerals refer to corresponding parts throughout the several figures of the drawings.

For the purpose of illustration, the invention is applied to a gate, but it is equally applicable to other closures operating in a similar manner and in the form shown the gate 10 is disposed intermediate the opposite posts 11 and 12, the latter being provided with a fixed pivot 13 cooperating with a bearing 14 at the upper portion of the gate. The lower portion of the gate is mounted upon a pivot 15 disposed eccentrically to the axis 16 of a shifting lever 17 and this pivot 15 being spaced from the axis 16 causes a lateral tilting of the lower portion of the gate which shifts its pivotal axis and increases the gravity controlled opening and closing movements.

The pivot 15 is embraced by a bearing 18 secured to the gate and retained against vertical movement thereon by the bearing nuts 19. The pivoted end of the lever 17 is further formed with shoulders 20 cooperating with a stop 21 to limit the travel of the shifting lever and pivot 15 thereon, which as shown in Figure 3, traverses an arc of substantially 100 degrees so as to laterally displace the lower pivot of the gate and produce a bodily vertical movement thereof to release the latch 22 from its keeper 23 and permit the gate to then swing by gravity into its opn position.

The outer end of the lever 17 is bifurcated at 24 to receive pivots 25 extending from a collar 26, and if desired this collar may be elongated by the use of a sleeve 27 having an aperture to permit the free passage therethrough of the operating cable or connection 28. This connection is provided with spaced blocks or abutments 29 and 29ª which in the travel of the connection engage the opposite ends of the collar and thereby shift the lever carrying the gate pivot from the full line position shown in Figure 3 to that shown by dotted lines.

The connection or cable 28 may be actuated by any preferred form of trip device, there being shown frame members 30 and 30ª at opposite sides of the gate pivotally supported at 31 upon the ground level. These trips are substantially similar in construction and each formed with an arm 32 pivotally connected at 33 to a clamp 34 secured upon the cable 28. This cable is of endless form, as shown in Figure 2, and the runs thereof crossed intermediate the bearing sheaves 35 at each cable loop.

The trip devices are adapted to be depressed from a vertical position by an approaching vehicle, as indicated at 36, and are automatically restored to operative position by any preferred connection, such for instance as the cable 37 extending over guide pulleys 38 and connected at one end 39 with the clamp 34 and at the opposite end with a restoring weight 40.

In the operation of the invention, a vehicle approaching the gate as indicated in Figure 2, depresses the trip 30ª and through its connection with the crossed cable transmits motion to the shifting lever causing it to carry the gate pivot eccentrically mounted thereon into a position at one side of the fixed upper pivot of the gate. This results in a preliminary vertical movement to release the gate and through its shifted vertical axis the weight of the gate causes it to swing into an open position, as indicated by dotted lines in Figures 2 and 3, at which time the lever is held by the weight of the gate thereon. With the gate closed, as in full lines (Fig. 3) the abutment 29 upon the cable 28 engages the lever collar and in the shifting and trip restoring movements the collar is positioned to engage the opposite abutment 29ª, as shown by broken lines. As soon as the vehicle wheel leaves the trip used for opening, it is automatically raised by the restoring device. The opposite trip is then depressed by the vehicle wheel, causing a reverse movement of the cable 28 and causing the abutment 29ª to actuate the shifting lever which restores the parts from the dotted line position to that shown in full lines and closes the gate.

In the instance of a vehicle approaching from the direction opposite to that just described, a similar operation occurs with the trip 30 acting first to open the gate and the trip 30ª to subsequently close the same. It will thus be understood that these trips are located at a proper distance from the gate to permit time for the operation of the gate before the vehicle reaches the same and the restoring of the trips to a vertical position between the instant of contact with one trip and that of the vehicle with the opposite trip.

It will be seen that the invention provides a simple form of shift lever by which the pivotal axis of the gate may be shifted laterally to cause a releasing action thereof and a movement of the gate by gravity either in its opening or closing operation. The operating connections provided insure the efficient successive opening and closing of the gate in either direction of travel of a vehicle approaching the same and means by which the trips are restored to operative position immediately upon their release from the wheel of a vehicle.

While the specific details of construction of the lever and its operating means have been shown and described the invention is not confined thereto as changes and alterations may be made without departing from the spirit of the invention as defined by the appended claims.

Having thus described my invention, what I claim as new and desire to secure by Letters Patent of the United States is:—

1. In a gate operating device, a support, a gate having an upper fixed pivot, a pivoted shifting lever, a lower gate pivot upon said lever disposed eccentrically to the lever pivot and movable in an arc about the same, and a reciprocating connection having spaced abutting means for shifting said lever in opposite directions.

2. In a gate operating device, a gate, a lever carrying a pivot therefor and disposed to shift the pivotal axis of the gate laterally to permit its movement by gravity, trips at opposite sides of said gate, and an endless actuating cable connected for operation by said trips and movable through the free end of said lever and carrying spaced abutting means to engage said lever.

3. In a gate operating device, a gate, a pivoted shifting lever therefor having a bifurcated end and a gate pivot disposed eccentric to the axis of the lever, a collar pivoted to said end, an operating member freely movable within the collar, and spaced abutments secured to said member to engage the opposite ends of said collar.

4. In a gate operating device, a gate having a fixed pivot, a shifting lever provided with a pivot for the gate movable to vary the vertical axis of the gate, trip devices disposed at opposite sides of the gate, and adapted to normally occupy a vertical position, an operating connection between said devices, and spaced abutments carried by said connection to engage and shift the lever in opposite directions.

5. In a gate operating device, a gate having a fixed pivot, a shifting lever provided with a pivot for the gate movable to vary the vertical axis of the gate, trip devices disposed at opposite sides of the gate and adapted to normally occupy a vertical position, an endless operating cable between said devices, spaced abutments carried by said cable to engage and shift the lever in opposite directions, an arm projected from the trip device and secured to said cable, and a restoring device for said arm.

6. In a gate operating device, a pivoted gate, shifting means comprising a lever extending from a pivot thereof, trip devices disposed at opposite sides of the gate, an operating connection between said devices freely movable relative to the shifting means, and spaced means carried by said connection to engage and operate the shifting means in opposite directions.

7. In a gate operating device, a support, a gate having a fixed pivot thereon, a pivoted shifting lever, a gate pivot carried by said lever eccentrically to its axis and movable in an arc relative thereto whereby the pivotal axis of the gate is shifted laterally, opposite shoulders upon said lever adjacent the pivot thereof, and a stop device disposed intermediate said shoulders to limit the travel of the gate pivot and its lever.

In testimony whereof I affix my signature.

CLIFFORD M. MURPHY.